(12) United States Patent
Sato

(10) Patent No.: US 12,465,170 B2
(45) Date of Patent: Nov. 11, 2025

(54) WASHING DEVICE AND EXTRACTION SYSTEM

(71) Applicant: IZUMI FOOD MACHINERY CO., LTD., Hyogo (JP)

(72) Inventor: Takemi Sato, Hyogo (JP)

(73) Assignee: IZUMI FOOD MACHINERY CO., LTD., Hyogo (JP)

( * ) Notice: Subject to any disclaimer, the term of this patent is extended or adjusted under 35 U.S.C. 154(b) by 906 days.

(21) Appl. No.: 17/484,570

(22) Filed: Sep. 24, 2021

(65) Prior Publication Data

US 2022/0007881 A1    Jan. 13, 2022

Related U.S. Application Data

(63) Continuation of application No. PCT/JP2019/021559, filed on May 30, 2019.

(30) Foreign Application Priority Data

Mar. 25, 2019   (JP) .................................. 2019-056004

(51) Int. Cl.
*A47J 31/60*   (2006.01)
*B01D 29/01*   (2006.01)
(Continued)

(52) U.S. Cl.
CPC ............ *A47J 31/60* (2013.01); *B01D 29/014* (2013.01); *B01D 29/6446* (2013.01);
(Continued)

(58) Field of Classification Search
CPC .......... B01D 2201/084; B01D 29/6446; B01D 29/965; B01D 29/014; B01D 2201/085;
(Continued)

(56) References Cited

U.S. PATENT DOCUMENTS

2007/0246070 A1* 10/2007 Gunnerson ......... A47L 15/4418
                                                                134/25.2
2012/0032624 A1*  2/2012 Peterson ............... H02P 29/025
                                                                318/479
(Continued)

FOREIGN PATENT DOCUMENTS

JP     H07-027425 U      5/1995
JP     H0727425 U   *    5/1995
(Continued)

OTHER PUBLICATIONS

International Search Report issued in Application No. PCT/JP2019/021559, mailed Aug. 13, 2019.

*Primary Examiner* — Tiffany T Tran
(74) *Attorney, Agent, or Firm* — Michael Best & Friedrich LLP

(57) ABSTRACT

Provided is a washing device that washes a filter of an extraction device with a fluid, the extraction device including an extraction tank for storing an extraction material, a lid body supported openably and closably at a lower portion of the extraction tank, and the filter which is provided on the lid body, and on which the extraction material is placed, the washing device including, a tube body which is disposed at a fixed position with respect to the extraction tank, and through which the fluid passes, and an ejection port provided on the tube body and injecting the fluid toward the filter when the lid body is in an open state.

6 Claims, 8 Drawing Sheets

(51) Int. Cl.
*B01D 29/64* (2006.01)
*B01D 29/96* (2006.01)

(52) U.S. Cl.
CPC ...... *B01D 29/965* (2013.01); *B01D 2201/085* (2013.01); *B01D 2201/087* (2013.01)

(58) Field of Classification Search
CPC ..... B01D 2201/087; A47J 31/60; A47J 61/60; A47J 61/4403; A47J 31/44; B08B 3/02; A47L 15/4418; A47L 2401/12; A47L 15/4287; A47L 2501/05; B47J 31/60
USPC .......................................................... 99/290
See application file for complete search history.

(56) References Cited

U.S. PATENT DOCUMENTS

| | | | | |
|---|---|---|---|---|
| 2013/0206706 | A1* | 8/2013 | Ekholm | B01D 29/68 210/97 |
| 2016/0338567 | A1* | 11/2016 | Kong | A47L 15/245 |
| 2018/0177328 | A1* | 6/2018 | Fin | A47J 31/3633 |
| 2018/0228200 | A1* | 8/2018 | Sorenson | B08B 1/34 |
| 2021/0345853 | A1* | 11/2021 | Zhang | B05B 1/044 |

FOREIGN PATENT DOCUMENTS

| | | | |
|---|---|---|---|
| JP | H08-112205 A | | 5/1996 |
| JP | 3039433 U | * | 7/1997 |
| JP | 2012-085910 A | | 5/2012 |

\* cited by examiner

FIG. 2
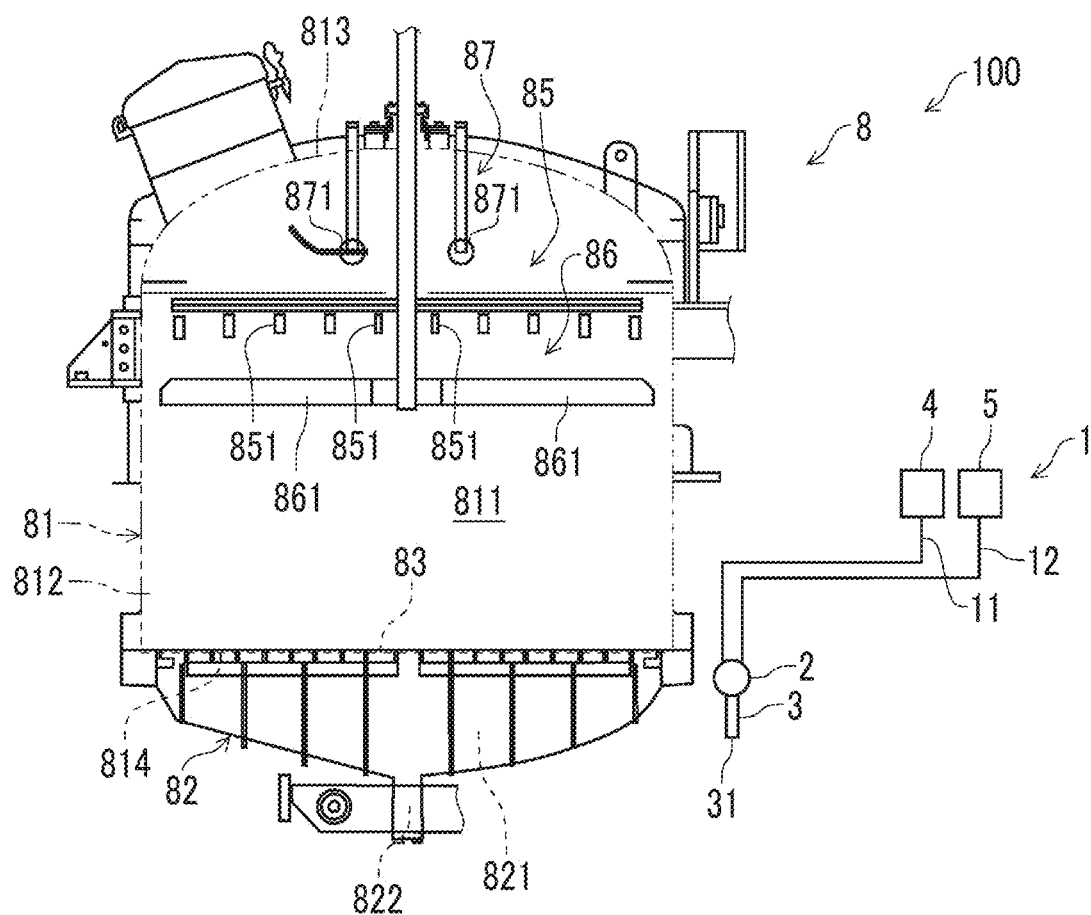
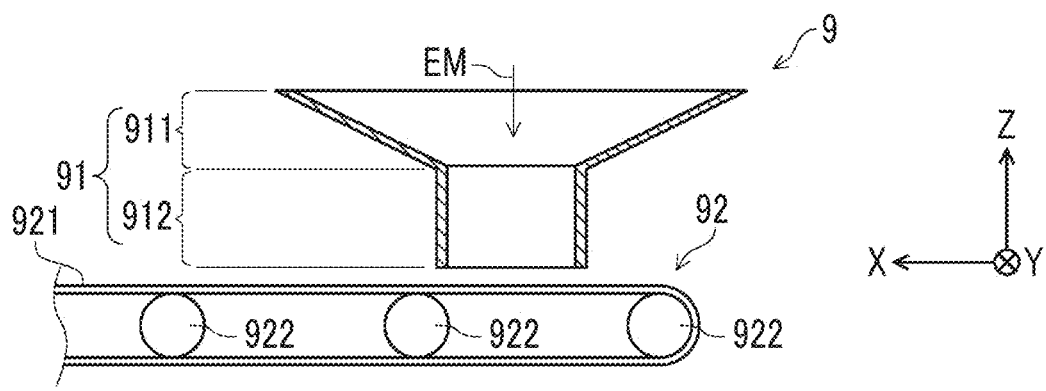

WASHING DEVICE AND EXTRACTION SYSTEM

RELATED APPLICATIONS

The contents of Japanese Patent Application No. 2019-056004, and of International Patent Application No. PCT/JP2019/021559, on the basis of each of which priority benefits are claimed in an accompanying application data sheet, are in their entirety incorporated herein by reference.

BACKGROUND

Technical Field

Certain embodiments of the present invention relate to a washing device and an extraction system.

Description of Related Art

An extraction device that extracts an extract from an extraction material such as coffee beans or tea leaves is known (for example, refer to the related art). The extraction device described in the related art includes an extraction tank for storing the extraction material, a bottom lid supported openably and closably by an opening portion at a lower portion of the extraction tank, and a wire mesh filter which is provided on the bottom lid and on which the extraction material is placed. The extraction device is required to regularly wash the filter, and a washing device is used for the washing.

SUMMARY

According to one aspect of the present invention, there is provided a washing device that washes a filter of an extraction device with a fluid, the extraction device including an extraction tank for storing an extraction material, a lid body supported openably and closably at a lower portion of the extraction tank, and the filter which is provided on the lid body, and on which the extraction material is placed, the washing device including, a tube body which is disposed at a fixed position with respect to the extraction tank, and through which the fluid passes, and an ejection port provided on the tube body and injecting the fluid toward the filter when the lid body is in an open state.

According to another aspect of the present invention, there is provided an extraction system including, an extraction device including an extraction tank for storing an extraction material, a lid body supported openably and closably at a lower portion of the extraction tank, and a filter which is provided on the lid body, and on which the extraction material is placed, and the above-described washing device that washes the filter with a fluid.

BRIEF DESCRIPTION OF THE DRAWINGS

FIG. 2 is a vertically partial cross-sectional side view illustrating the one embodiment of the extraction system (closed state of the lid body) of the present invention.

DETAILED DESCRIPTION

A washing device includes: a washing pipe provided with a plurality of fluid injection nozzles for injecting a fluid to a filter of a bottom lid in an open state; and a support mechanism that supports the washing pipe movably from an upper side to a lower side along the filter. The support mechanism has two guide rails and a plurality of sliders that slide on each of the guide rails, and the configuration is complicated due to a relatively large number of components.

In addition, as the number of components of the support mechanism increases, the size of the washing device tends to increase. It is difficult to install and use large-sized devices, depending on an installation space or a movable space.

It is desirable to provide a washing device and an extraction system capable of reducing the size and reliably washing a filter of an extraction device with a simple configuration.

According to the present invention, washing is performed when the lid body is in an open state in a state where the tube body is disposed to be fixed, and thus, the device configuration is simpler than, for example, a configuration in which the tube body is moved along the filter of the extraction device, and this contributes to the reduction of the size of the device. Further, when washing the filter, in a case of a configuration in which the lid body revolves or the tube body revolves, the location where the fluid is sprayed on the extraction material can be changed, and accordingly, the washing can be reliably performed.

Hereinafter, a washing device and an extraction system of the present invention will be described in detail based on the preferred embodiments illustrated in the accompanying drawings.

One Embodiment

Figure 1:
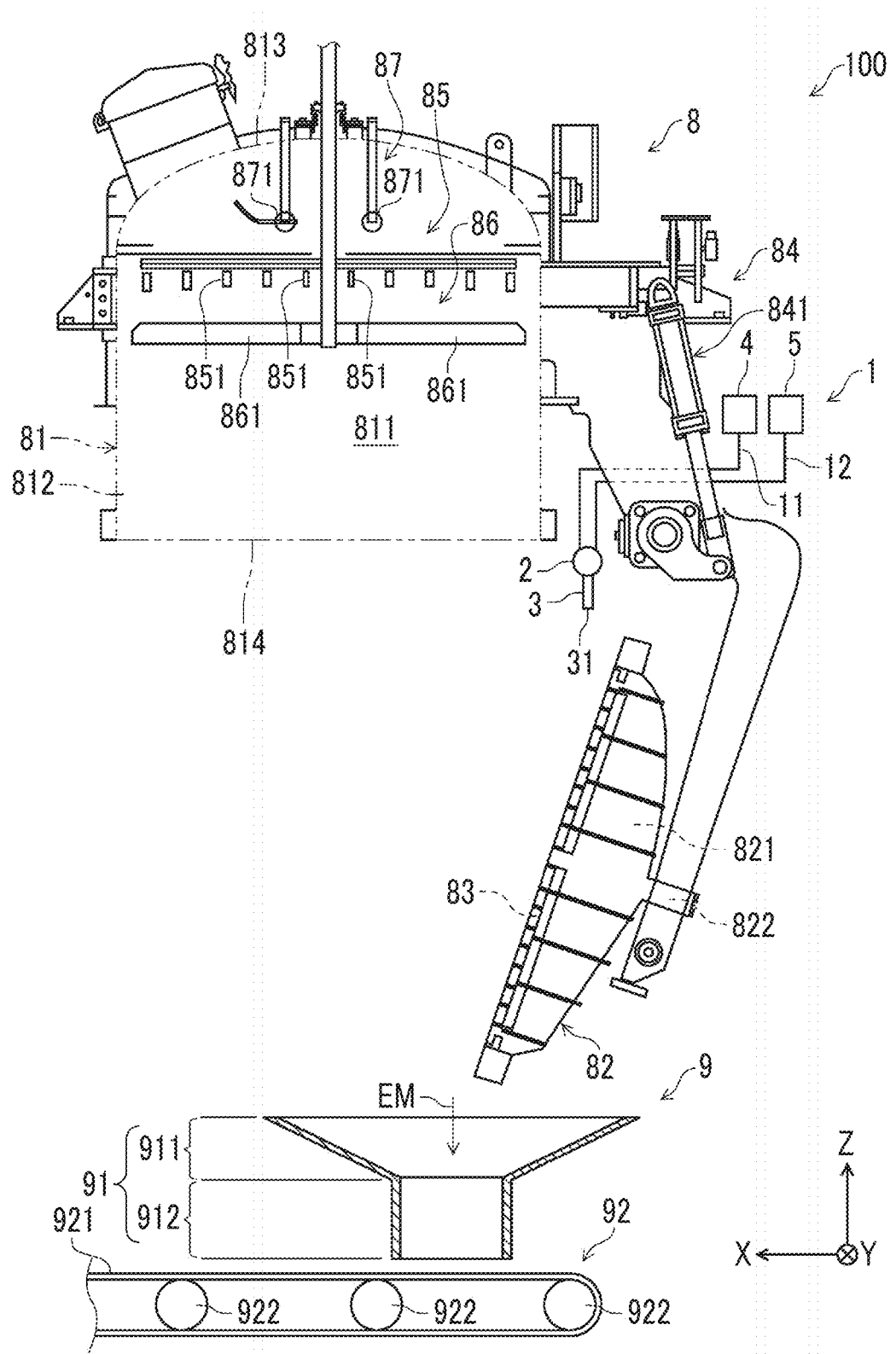
FIG. 1 is a vertically partial cross-sectional side view illustrating one embodiment of an extraction system (open state of a lid body) of the present invention.
Figure 3:
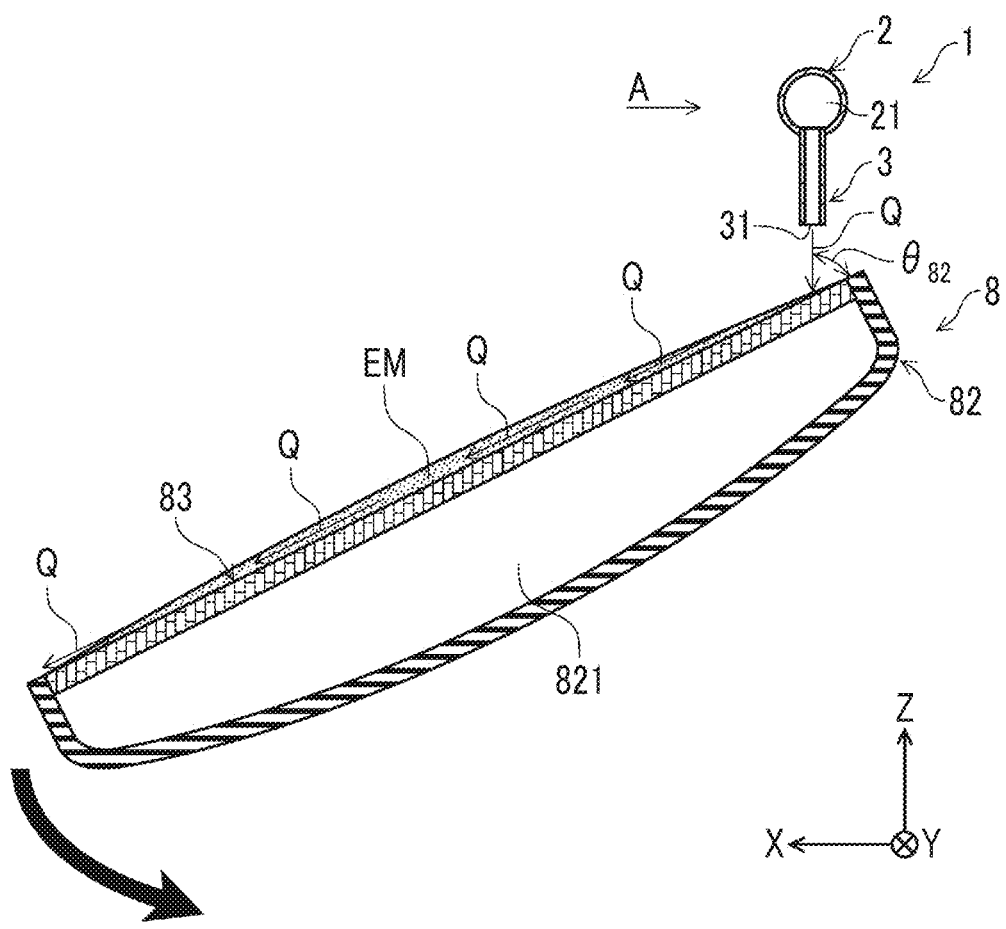
FIG. 3 is a vertically partial cross-sectional side view illustrating a washing state (first state) of the lid body in the extraction system of the present invention.
Figure 4:
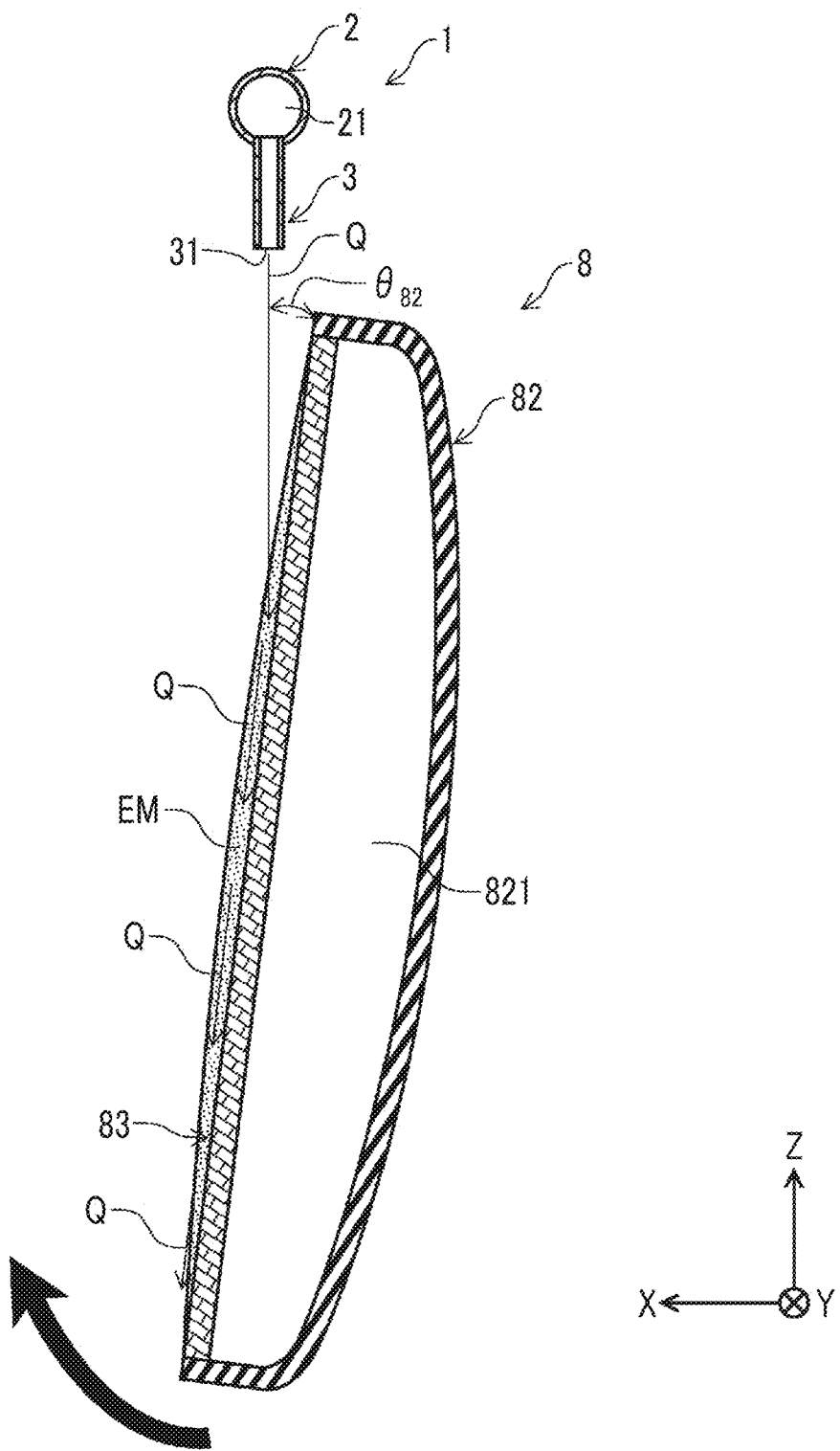
FIG. 4 is a vertically partial cross-sectional side view illustrating a washing state (second state) of the lid body in the extraction system of the present invention.
Figure 5:
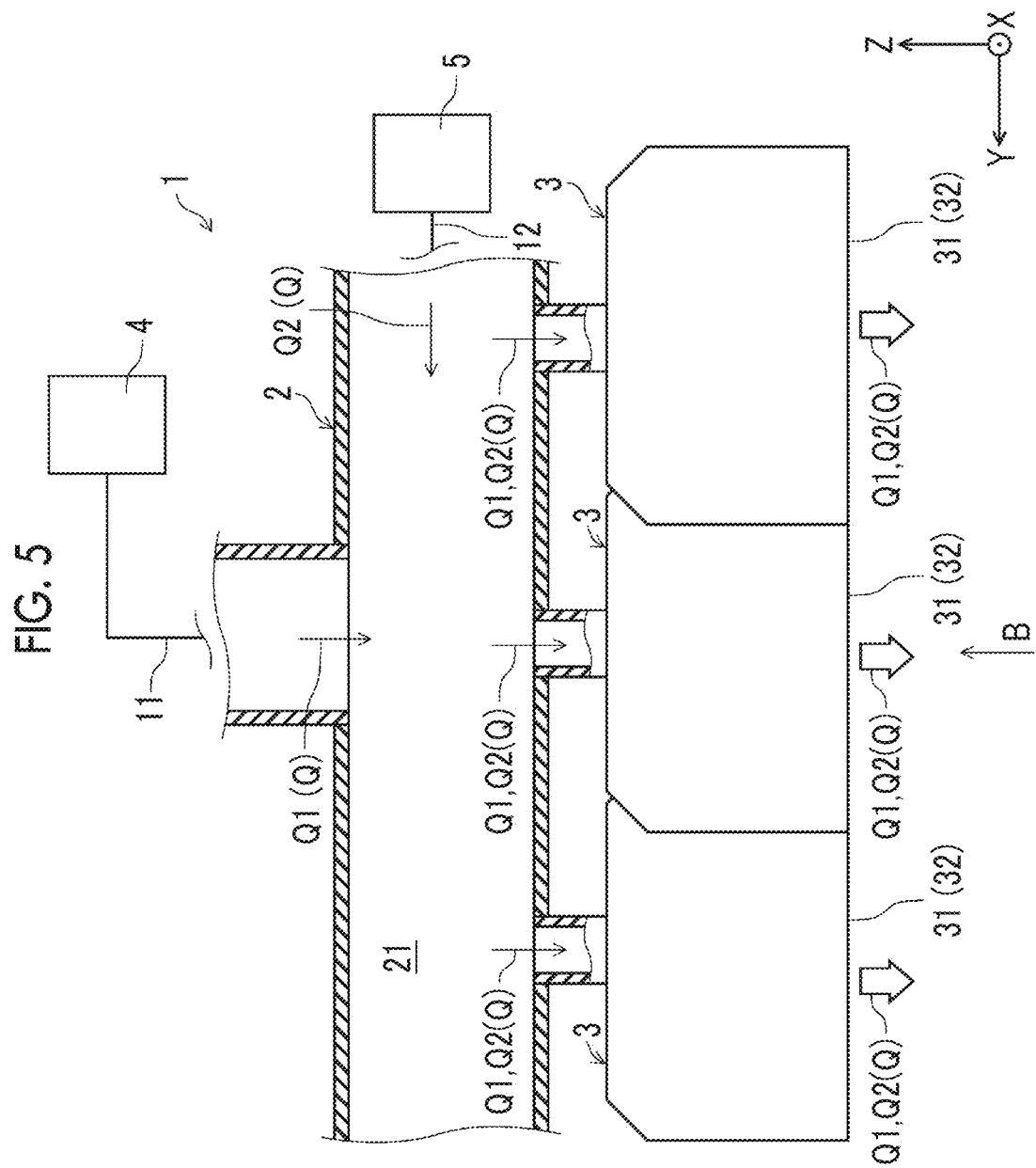
FIG. 5 is a vertically partial cross-sectional side view when viewed from a direction of an arrow A in FIG. 3.
Figure 6:
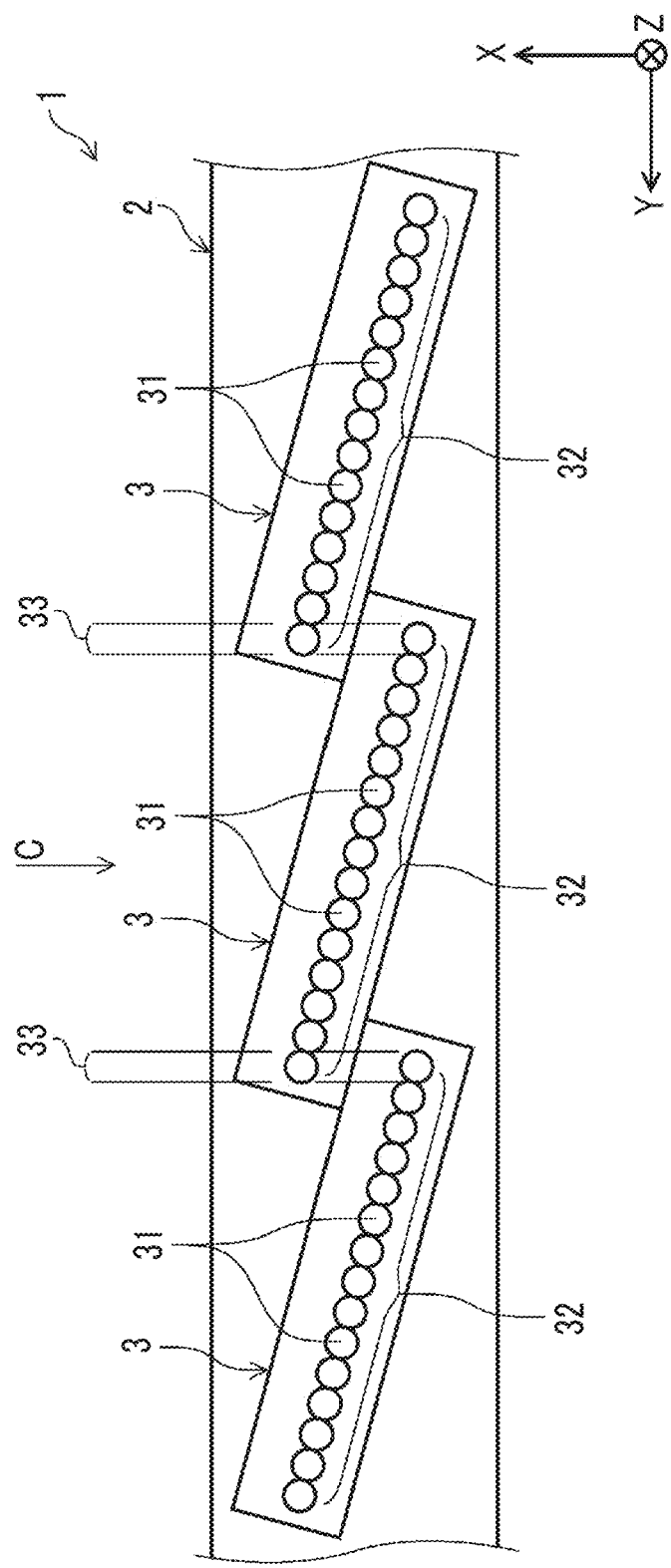
FIG. 6 is a bottom view when viewed from a direction of an arrow B in FIG. 5.

FIG. 1 is a vertically partial cross-sectional side view illustrating one embodiment of an extraction system (open state of a lid body) of the present invention. FIG. 2 is a vertically partial cross-sectional side view illustrating the one embodiment of the extraction system (closed state of the lid body) of the present invention. FIG. 3 is a vertically partial cross-sectional side view illustrating a washing state (first state) of the lid body in the extraction system of the present invention. FIG. 4 is a vertically partial cross-sectional side view illustrating a washing state (second state) of the lid body in the extraction system of the present invention. FIG. 5 is a vertically partial cross-sectional side view when viewed from a direction of an arrow A in FIG. 3. FIG. 6 is a bottom view when viewed from a direction of an arrow B in FIG. 5.

In the following, for convenience of description, one direction of the horizontal direction is referred to as "X-axis direction", a direction perpendicular to the X-axis direction in the horizontal direction is referred to as "Y-axis direction", and a vertical direction, that is, a direction perpendicular to the X-axis direction and the Y-axis direction is referred to as "Z-axis direction". In addition, the arrow side in each axial direction is referred to as a "positive side", and the side opposite to the arrow is referred to as a "negative side". In addition, the upper side in FIGS. 1 to 5 is referred to as "upper (or upper part)", and the lower side is referred to as "lower (lower part)".

As illustrated in FIGS. 1 and 2, an extraction system 100 includes an extraction device 8, a washing device 1, and a collection device 9. Hereinafter, the configuration of each part will be described.

The extraction device 8 is a device that extracts an extract from an extraction material EM. The extraction material EM is not particularly limited, and examples thereof include coffee beans, tea leaves, dried bonito, and kelp.

The extraction device 8 includes an extraction tank 81, a lid body 82, a filter 83, a lid body revolving driving unit 84, a treatment liquid supply unit 85, a leveling unit 86, and a tank washing unit 87.

The extraction tank 81 is configured with a hollow body, and the extraction material EM can be stored in an internal space 811 thereof. The volume of the internal space 811 depends on the usage state of the extraction device 8, but may be, for example, 50 L or more and 10000 L or less.

The extraction tank 81 has a tubular side wall portion 812 and an upper wall portion 813 that covers the upper side of the side wall portion 812. Further, the lower side of the side wall portion 812 is a lower opening portion 814 that opens downward.

At the lower portion of the extraction tank 81, the lid body 82 is supported openably and closably with respect to the lower opening portion 814 via the lid body revolving driving unit 84. The lid body 82 can take a fully open state illustrated in FIG. 1, a fully closed state illustrated in FIG. 2, and an intermediate state between the fully open state and the fully closed state, and can stop in each state by the lid body revolving driving unit 84.

The lid body 82 can seal the lower opening portion 814 in the fully closed state. In this state, the extract can be extracted.

In the fully open state, the lid body 82 can open the lower opening portion 814 downward. Further, in this state, for example, the extraction material EM can be discarded or the filter 83 can be washed.

The lid body 82 forms a flat shape, and has a recessed portion 821 facing the internal space 811 of the extraction tank 81 in the fully closed state at a part of the inside (reverse side) thereof. In addition, the filter 83 is installed to cover the recessed portion 821 (refer to FIGS. 3 and 4).

The lid body revolving driving unit 84 has a hydraulic cylinder 841, and can make the lid body 82 revolve by the operation of the hydraulic cylinder 841. In addition, by this revolving, the lid body 82 can approach and separate from the lower opening portion 814 of the extraction tank 81 to open and close the lid body 82.

As described above, the lid body 82 is provided with the filter 83 to cover the recessed portion 821. The filter 83 has a sheet shape or a gentle slope downward from the center toward the sidewall portion, and is in a state of being sufficiently pulled in a surface direction thereof. Accordingly, when the lid body 82 is in the fully closed state, the filter 83 is in a horizontal posture or a gently inclined posture from the center toward the side wall portion, and the extraction material EM can be placed on the filter 83. Further, in this state, by supplying the treatment liquid such as water (containing hot water) to the extraction material EM, the extract containing the extraction component is extracted.

In addition, the filter 83 is made of wire mesh, flannel cloth, or the like. Accordingly, the extract passes through the filter 83 and is discharged from a discharge port 822 that communicates with the recessed portion 821 of the lid body 82. The configuration material of the filter 83 is not particularly limited, and for example, in a case of using a wire mesh, various metal materials having rust prevention properties such as aluminum and stainless steel can be used.

The treatment liquid supply unit 85 can supply the treatment liquid into the extraction tank 81 when the lid body 82 is in the fully closed state. The treatment liquid supply unit 85 has a plurality of nozzles 851 for injecting the treatment liquid to the extraction material EM on the filter 83.

The leveling unit 86 can make the thickness of the extraction material EM uniform on the filter 83. The leveling unit 86 has a plurality of plate members 861 disposed below the nozzle 851 and rotatably supported around an axis parallel to the Z-axis direction. Further, in a state of collectively being in contact with the extraction material EM, each of the plate members 861 rotates in the same direction, and accordingly, the extraction material EM can be made uniform.

The extraction device 8 can raise and lower the nozzle 851 and the plate member 861 in the up-down direction. Accordingly, the heights of the nozzle 851 and the plate member 861 can be adjusted according to the operating state of the extraction device 8.

The tank washing unit 87 can wash mainly the inside of the extraction tank 81 when the lid body 82 is in the fully open state. The tank washing unit 87 has a ball-shaped spray unit 871 provided on the upperwall portion 813 side of the extraction tank 81. The spray unit 871 can spray the washing liquid inside the extraction tank 81. Accordingly, the inside of the extraction tank 81 is washed.

The collection device 9 is a device that collects the extraction material EM that has fallen from the filter 83 during the washing. The collection device 9 includes a hopper 91 and a belt conveyor 92.

As illustrated in FIG. 1, the hopper 91 is disposed below the lid body 82 in the open state. The hopper 91 has a mortar-shaped introduction unit 911 and a tubular discharge unit 912 protruding downward from the center portion of the introduction unit 911.

The introduction unit 911 can introduce (guide) the extraction material EM that has fallen from the filter 83 toward the discharge unit 912.

The discharge unit 912 communicates with the introduction unit 911, and the extraction material EM that has passed through the introduction unit 911 can be discharged toward the belt conveyor 92.

The belt conveyor 92 is disposed below the discharge unit 912. The belt conveyor 92 has an endless belt 921 and a plurality of rollers 922 for rotationally driving the endless belt 921. Each roller 922 is supported to be capable of revolving around an axis parallel to the Y-axis direction.

The extraction material EM discharged from the discharge unit 912 is deposited on the endless belt 921. In this state, the endless belt 921 is rotationally driven such that the extraction material EM on the endless belt 921 can be transported toward the positive side in the X-axis direction.

It is preferable that, for example, a collection box or the like in which the extraction material EM is collected is disposed at the transport destination of the extraction material EM.

In addition, the collection device 9 is not limited to the configuration having the belt conveyor 92, and for example, instead of the belt conveyor 92, a configuration having a screw conveyor may be employed.

The washing device 1 is a device for washing the filter 83 with a fluid Q. As illustrated in FIGS. 1 and 2, the washing device 1 includes, the tube body 2 through which the fluid Q passes, a nozzle unit 3 formed separately from the tube body 2 and connected to the tube body 2; a liquid supply unit 4 connected to the tube body 2 via a relay tube 11, and a gas supply unit 5 connected to the tube body 2 via a relay tube 12. Since the nozzle unit 3 is formed separately from the tube body 2, for example, the number of connections to the tube body 2 can be changed in any manner according to the size of the washing device 1.

As illustrated in FIGS. 3 and 4, the tube body 2 has a circular cross-sectional shape, and the fluid Q can pass through the internal space 21 thereof. The cross-sectional shape of the tube body 2 is circular in the present embodiment, but is not limited thereto, and may be, for example, elliptical or polygonal.

The tube body 2 is disposed at a fixed position with respect to the extraction tank 81. This disposition position is a position that does not interfere with the lid body 82 regardless of the opening and closing operation of the lid body 82. Further, in the present embodiment, the tube body 2 is disposed while the longitudinal direction thereof is parallel to the Y-axis direction.

As illustrated in FIGS. 5 and 6, the plurality of nozzle units 3 communicate with and are connected to the tube body 2. Each of the nozzle units 3 has a plurality of nozzles 31 as ejection ports for ejecting the fluid Q, and is a member unitized as a nozzle row (ejection port row) 32 in which these nozzles 31 are arranged in a row at equal intervals. Further, each of the nozzle units 3 (nozzle rows 32) is disposed at equal intervals along the longitudinal direction of the tube body 2, that is, the Y-axis direction. From each of the nozzles 31, the fluid Q that has passed through the tube body 2 can be injected downward. The ejection port is configured with the nozzle unit 3 formed separately from the tube body 2, but is not limited thereto, and may be configured with side holes formed in a slit shape along the longitudinal direction of the tube body 2.

Next, the washing state by the washing device 1 will be described.

First, prior to the washing by the washing device 1, after the extraction of the extract is completed in the fully closed state of the lid body 82, the lid body revolving driving unit 84 temporarily makes the lid body 82 to be in the fully open state. Accordingly, the extraction material EM on the filter 83 falls under its own weight.

However, as the extraction material EM, in addition to the extraction material EM that falls from the filter 83, for example, there is also an extraction material EM remaining by being attached to or entangled with the filter 83. The washing device 1 can remove the remaining extraction material EM from the filter 83.

In order to perform the washing by the washing device 1, first, as illustrated in FIG. 3, the lid body 82 is set to a half-open state. Here, the "half-open state" is an intermediate state between the fully open state and the fully closed state. Further, in a case where the injection direction of the fluid Q from each of the nozzles 31 is the negative side in the Z-axis direction, the filter 83 is inclined with respect to the injection direction of the fluid Q regardless of whether the filter 83 is in the half-open state or the fully open state (refer to FIGS. 3 and 4). The size of this inclination angle $\theta_{82}$ changes depending on whether the filter 83 is in the half-open state or the fully open state, but the inclination angle is 0° or an acute angle in either state.

In addition, in the half-open state, each of the nozzles 31 is an ejection port that injects the fluid Q toward the filter 83. Accordingly, the fluid Q from each of the nozzles 31 can be sprayed at 0° or an acute angle of the inclination angle $\theta_{82}$ with respect to the filter 83, and the extraction material EM remaining on the upper side of the filter 83 in the inclination direction can be scraped off. Then, the extraction material EM scraped off by the fluid Q presses the extraction material EM below the extraction material EM in the inclination direction, together with the fluid Q downward in the inclination direction. Accordingly, the extraction material EM remaining on the filter 83 is gradually removed.

In addition, when the lid body 82 revolves from the state illustrated in FIG. 3 while maintaining the state where the fluid Q is injected, the lid body 82 is in the fully open state as illustrated in FIG. 4. Even in the state illustrated in FIG. 4, the fluid Q from each of the nozzles 31 is sprayed at 0° or an acute angle of the inclination angle $\theta_{82}$ with respect to the filter 83. In the state illustrated in FIG. 4, the fluid Q can scrape off the extraction material EM remaining in the middle (near the center portion) of filter 83 in the inclination direction. Accordingly, as described above, the extraction material EM scraped off by the fluid Q presses the extraction material EM below the extraction material EM in the inclination direction, together with the fluid Q downward in the inclination direction.

The washing device 1 can sufficiently remove the extraction material EM remaining on the filter 83 by alternately repeating the state illustrated in FIG. 3 and the state illustrated in FIG. 4, and accordingly, it is possible to reliably wash the filter 83. After washing the filter 83, the injection of the fluid Q is stopped, and the lid body 82 is in the fully closed state again.

As described above, in the washing device 1, while the position of the tube body 2 with respect to the extraction tank is fixed, the lid body revolving driving unit 84 can inject the fluid Q from each of the nozzles 31 toward the filter 83 while making the lid body 82 revolve. Accordingly, for example, without moving the tube body 2 along the filter 83, it is possible to change the location where the fluid Q is sprayed with respect to the extraction material EM remaining on the filter 83. Such a configuration is simpler than a configuration in which the tube body 2 is moved, and contributes to reduction of the size of the washing device 1. In addition, the washing device 1 can prevent the occurrence of uneven washing with respect to the filter 83, that is, the filter 83 can be uniformly and reliably washed.

As described above, when the nozzle 31 injects the fluid Q, the injection direction of the fluid Q becomes 0° or an acute angle with respect to the filter 83. Accordingly, the inclination angle $\theta_{82}$ effective for scraping off the extraction material EM remaining on the filter 83 can be obtained, and accordingly, the extraction material EM can be quickly removed, that is, the filter 83 can be washed.

The direction of the tube body (nozzle) is preferably directed in the Z-axis direction (directly downward direction). In this case, since the fluid Q for washing is oriented toward the lid body 82 (filter 83) according to gravity, the straightness (penetration force) of the fluid Q can be maintained without increasing the pressure of the fluid Q for washing that much.

In addition, when the nozzle 31 injects the fluid Q, the fluid Q is injected while spreading toward the filter 83, and the spreading angle thereof is preferably 15 degrees or less, and more preferably 0 degrees or more and 5 degrees or less. Accordingly, the straightness of the fluid Q at the time of injection can be maintained as much as possible, and thus, the loss of the fluid Q that contributes to washing can be prevented.

As illustrated in FIG. 6, in each of the nozzle units 3, the disposition direction of the nozzle row 32 is inclined with respect to the Y-axis direction. When the tube body 2 is viewed from the horizontal direction perpendicular to the longitudinal direction of the tube body 2 (in FIG. 6, when viewed from an arrow direction C, that is, when viewed from the positive side to the negative side in the X-axis direction), two nozzle rows 32 adjacent to each other in the longitudinal direction of the tube body 2 share an overlapping unit 33 in which at least one nozzle 31 in one nozzle row 32 and at least one nozzle 31 in the other nozzle row 32, out of these nozzle rows 32, overlap each other. Accordingly, when washing the filter 83, washing is possible with the nozzle 31 of the overlapping unit 33 without any gap between the nozzle units 3, and accordingly, it is possible to prevent the occurrence of uneven washing with respect to the filter 83, that is, the filter 83 can be uniformly washed.

The tube body 2 is not limited to a case where the nozzle 31 is provided in the nozzle unit 3, and for example, the nozzle 31 may be provided with side holes formed through the tube wall of the tube body 2.

It is preferable that the disposition number of nozzles 31 disposed in the tube body 2 appropriately changes in accordance with the size of the filter 83.

In addition, the disposition number of nozzles 31 disposed in the tube body 2 is not limited to a plural number, and for example, may be one. In this case, the nozzle 31 preferably has a slit shape along the Y-axis direction.

As illustrated in FIG. 5, the liquid supply unit 4 is connected to the tube body 2 via the relay tube 11, and the gas supply unit 5 is connected to the tube body 2 via the relay tube 12.

The liquid supply unit 4 is connected to the middle of the tube body 2 in the longitudinal direction via the relay tube 11. The liquid supply unit 4 can supply a liquid Q1 containing water as the fluid Q to the tube body 2. The liquid supply unit 4 may have a temperature control unit that adjusts the temperature of the liquid Q1. Accordingly, for example, the liquid Q1 can be heated, and accordingly, the washing power with respect to the filter 83 is improved. In addition, the liquid Q1 may contain a detergent. Accordingly, the washing power with respect to the filter 83 is improved.

The gas supply unit 5 is connected to the negative side of the tube body 2 in the Y-axis direction via the relay tube 12. The gas supply unit 5 can supply a gas Q2 containing compressed air as the fluid Q to the tube body 2.

Then, from each of the nozzles 31, a mixed fluid of the liquid Q1 and the gas Q2 as the fluid Q can be injected by high-pressure jet injection. Accordingly, by blowing off the extraction material EM remaining on the filter 83, the extraction material EM can be peeled from the filter 83.

In the washing device 1, the mix of the liquid Q1 and the gas Q2 can be adjusted.

In addition, as a washing mode by the washing device 1, there is a mode in which the liquid Q1 and the gas Q2 are collectively injected from each of the nozzles 31, but in addition, for example, a mode in which the liquid Q1 and the gas Q2 are alternately injected from each of the nozzles 31 is also possible.

Further, after washing the filter 83, by injecting the gas Q2 to the filter 83, it is also possible to dry the filter 83.

Another Embodiment

Figure 7:
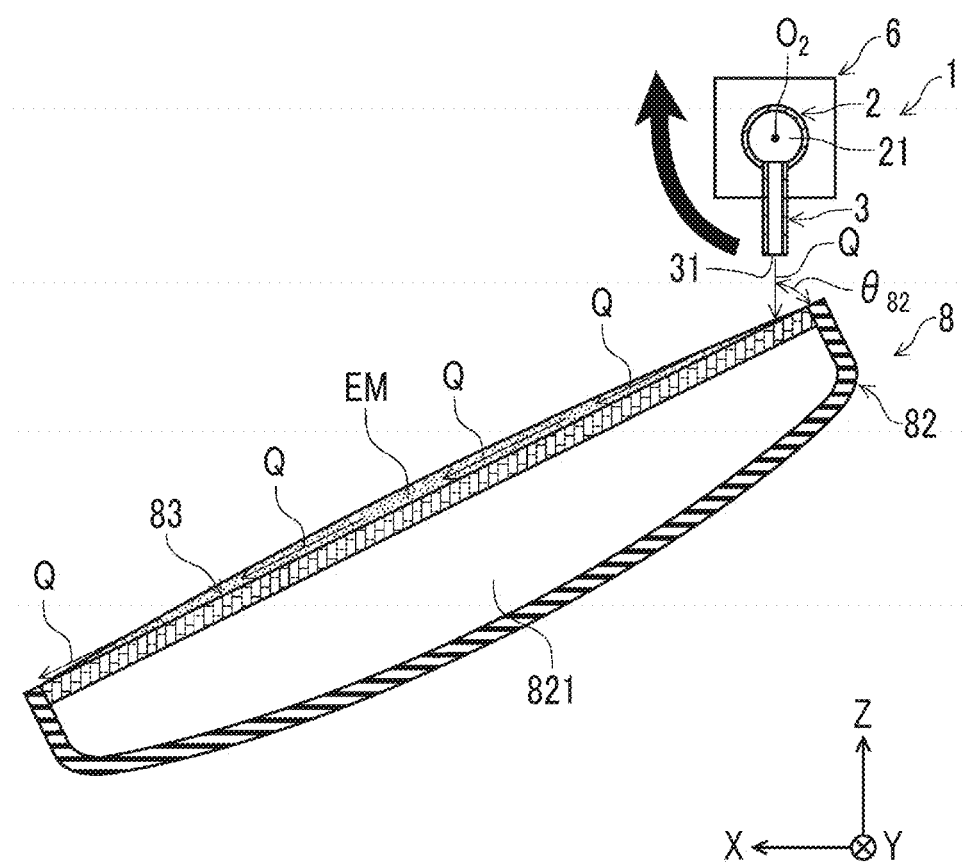
FIG. 7 is a vertically partial cross-sectional side view illustrating a washing state (first state) of the lid body according to another embodiment of the extraction system of the present invention.
Figure 8:
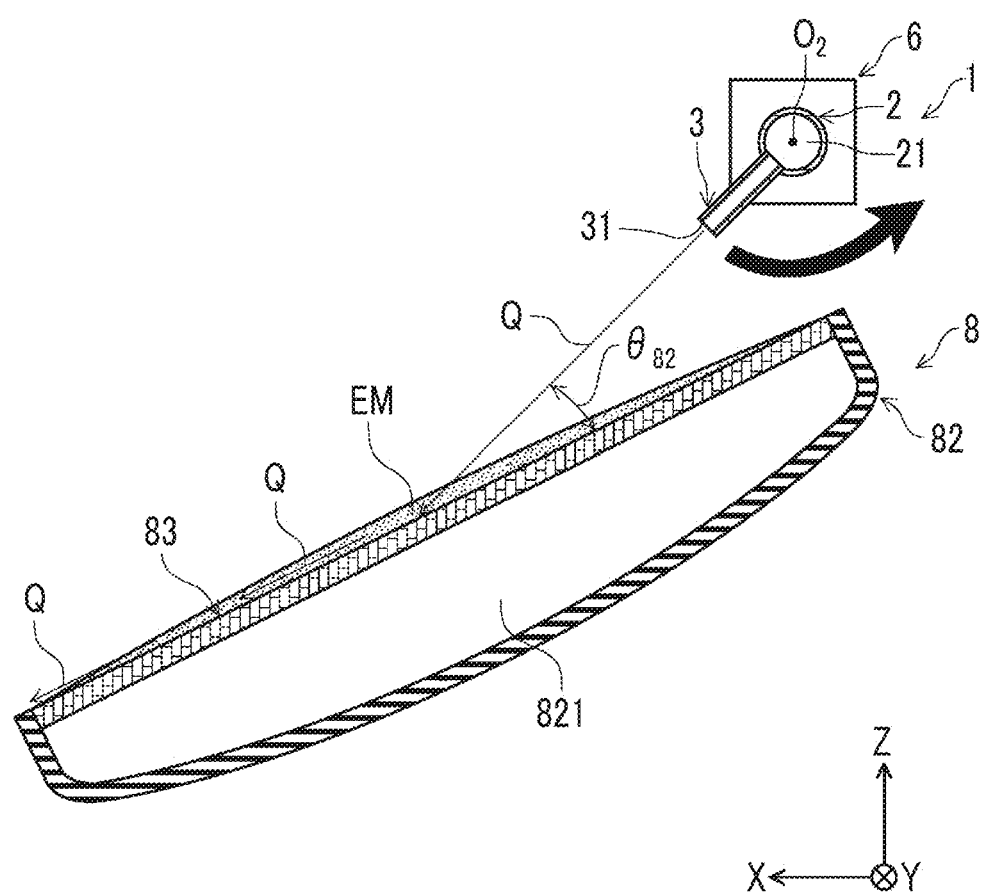
FIG. 8 is a vertically partial cross-sectional side view illustrating a washing state (second state) of the lid body according to the other embodiment of the extraction system of the present invention.

FIG. 7 is a vertically partial cross-sectional side view illustrating a washing state (first state) of the lid body according to another embodiment of the extraction system of the present invention. FIG. 8 is a vertically partial cross-sectional side view illustrating a washing state (second state) of the lid body according to the other embodiment of the extraction system of the present invention.

Hereinafter, the other embodiment of the washing device and the extraction system of the present invention will be described with reference to the drawings, but the differences from the above-described embodiments will be mainly described, and the same matters will be omitted.

As illustrated in FIGS. 7 and 8, in the present embodiment, the washing device 1 further includes a tube body driving unit 6 that makes the tube body 2 revolve around a center axis $O_2$ together with the nozzle unit 3 (nozzle 31). The tube body driving unit 6 is linked to the positive side of the tube body 2 in the Y-axis direction, and includes, for example, a motor and a reduction gear linked to the motor and having a plurality of gears that mesh with each other. Otherwise, for example, a mechanism that converts the reciprocating motion of the hydraulic cylinder or the like into the revolving of the tube body 2 may be used. Accordingly, the tube body 2 can reciprocally revolve around the center axis $O_2$ to shift each of the nozzles 31 to the state illustrated in FIG. 7 and the state illustrated in FIG. 8. In the state illustrated in FIG. 7, each of the nozzles 31 faces vertically downward. In the state illustrated in FIG. 8, each of the nozzles 31 faces diagonally downward to the left.

While maintaining the half-open state of the lid body 82 and making the tube body 2 reciprocate and revolve around the center axis $O_2$, the fluid Q is injected from each of the nozzles 31. In this case, the inclination angle $\theta_{82}$ is 0° or an acute angle regardless of the revolving angle of the tube body 2. Accordingly, the fluid Q from each of the nozzles 31 is sprayed at 0° or an acute angle of the inclination angle $\theta_{82}$ with respect to the filter 83.

In the state illustrated in FIG. 7, it is possible to scrape off the extraction material EM remaining on the upper side of the filter 83 in the inclination direction. In the state illustrated in FIG. 8, it is possible to scrape off the extraction material EM remaining in the middle of the filter 83 in the inclination direction. The washing device 1 can sufficiently remove the extraction material EM remaining on the filter 83 by alternately repeating the state illustrated in FIG. 7 and the state illustrated in FIG. 8. Accordingly, the filter 83 can be reliably washed.

The tube body driving unit 6 may be configured to have a variable revolving speed of the tube body 2, for example, according to the remaining amount of the extraction material EM. In this case, for example, the revolving speed of the tube body 2 can be reduced, and thus, the time during which the fluid Q is sprayed can also be increased. Accordingly, reliable washing can be performed.

Although the washing device and the extraction system of the present invention have been described above with reference to the illustrated embodiments, the present invention is not limited thereto, and each part that configures the washing device and the extraction system can be replaced with those having any configuration that exhibits the same function. Further, any component may be added.

Moreover, the washing device and the extraction system of the present invention may be a combination of any two or more configurations (features) of each of the above-described embodiments. For example, when washing the filter 83, the revolving of the lid body 82 and the revolving of the tube body 2 may be combined with each other to perform the washing.

It should be understood that the invention is not limited to the above-described embodiment, but may be modified into various forms on the basis of the spirit of the invention. Additionally, the modifications are included in the scope of the invention.

What is claimed is:

1. A washing device of an extraction device, which washes a filter of the extraction device with a fluid, the extraction device including an extraction tank for storing an extraction material, a lid body supported openably and closably at a lower portion of the extraction tank, a hydraulic cylinder that opens and closes the lid body, and the filter which is provided on the lid body, and on which the extraction material is placed, the washing device comprising:
   a tube body which is disposed at a predetermined position with respect to the extraction tank, and through which the fluid passes; and
   an ejection port provided on the tube body and injecting the fluid toward the filter when the lid body is in an open state,
wherein
   the tube body is located between the extraction tank and the hydraulic cylinder regardless of whether the lid body is in the open state or a closed state.

2. The washing device according to claim 1,
wherein an injection direction of the fluid of the ejection port is in a vertical direction and has 0° or an acute angle with respect to a surface of the filter when the fluid is injected in the open state of the lid body.

3. The washing device according to claim 2,
wherein a spreading angle of the fluid of the ejection port is 15° or less with respect to the filter when the fluid is injected.

4. The washing device according to claim 3,
wherein the spreading angle is 0° or more and 5° or less.

5. The washing device according to claim 2,
wherein the fluid ejected from the ejection port is introduced laterally into the filter.

6. The washing device according to claim 1,
wherein the ejection port is unitized as an ejection port row in which a plurality of the ejection ports are arranged in a row,
a plurality of the ejection port rows are arranged along a longitudinal direction of the tube body, and
at least one of the ejection ports in one ejection port row and at least one of the ejection ports in another ejection port row, out of two ejection port rows that are adjacent to each other in the longitudinal direction of the tube body, overlap each other when the tube body is viewed from a horizontal direction perpendicular to the longitudinal direction of the tube body.

* * * * *